United States Patent
Sakuma et al.

(10) Patent No.: US 12,327,278 B2
(45) Date of Patent: Jun. 10, 2025

(54) REMOTE BASED ONLINE PRODUCT SELECTION

(71) Applicant: INTERNATIONAL BUSINESS MACHINES CORPORATION, Armonk, NY (US)

(72) Inventors: Katsuyuki Sakuma, Fishkill, NY (US); Sarbajit K. Rakshit, Kolkata (IN); Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 668 days.

(21) Appl. No.: 17/548,480

(22) Filed: Dec. 10, 2021

(65) Prior Publication Data

US 2023/0186374 A1     Jun. 15, 2023

(51) Int. Cl.
*G06Q 30/06*        (2023.01)
*G06F 3/04815*      (2022.01)
*G06F 3/04842*      (2022.01)
*G06Q 30/0283*      (2023.01)
*G06Q 30/0601*      (2023.01)

(52) U.S. Cl.
CPC ..... *G06Q 30/0643* (2013.01); *G06F 3/04815* (2013.01); *G06F 3/04842* (2013.01); *G06Q 30/0283* (2013.01)

(58) Field of Classification Search
CPC ............ G06Q 30/0643; G06Q 30/0283; G06F 3/04815; G06F 3/04842
USPC ...................................................... 705/27.2
See application file for complete search history.

(56) References Cited

U.S. PATENT DOCUMENTS

| | | | |
|---|---|---|---|
| 11,093,123 B1 * | 8/2021 | Rossi | G06F 3/147 |
| 2005/0108620 A1 | 5/2005 | Allyn et al. | |
| 2008/0167975 A1 * | 7/2008 | Park | G06Q 30/0603 |
| | | | 705/26.1 |
| 2012/0072359 A1 * | 3/2012 | Shaouy | G06Q 50/01 |
| | | | 705/319 |
| 2017/0053169 A1 | 2/2017 | Cuban et al. | |
| 2017/0221264 A1 | 8/2017 | Perry | |
| 2018/0004283 A1 | 1/2018 | Mathey-Owens et al. | |
| 2018/0308187 A1 * | 10/2018 | Rotem | G06F 16/29 |

(Continued)

FOREIGN PATENT DOCUMENTS

| | | | | |
|---|---|---|---|---|
| CA | 2803526 A1 * | 2/2011 | | G06Q 30/02 |
| CN | 101715087 A * | 5/2010 | | G06F 3/0481 |

OTHER PUBLICATIONS

Mell, P. et al., "Recommendations of the National Institute of Standards and Technology"; NIST Special Publication 800-145 (2011); 7 pgs.

(Continued)

*Primary Examiner* — Yogesh C Garg
(74) *Attorney, Agent, or Firm* — Intelletek Law Group, PLLC; Gabriel Daniel, Esq.

(57) ABSTRACT

A computer implemented method for providing an online purchase includes displaying an electronic image of a plurality of items. A signal of a user drawn loop, drawn around one or more of the plurality of items in the electronic image is received through a network connection. The one or more items in the user drawn loop are identified. A cost for the items identified in the user drawn loop is determined. The cost is displayed.

17 Claims, 8 Drawing Sheets

(56) References Cited

U.S. PATENT DOCUMENTS

2019/0237188 A1* 8/2019 Nilsson .................. G16H 40/20
2022/0383286 A1* 12/2022 Bronicki ................ H04N 23/90

OTHER PUBLICATIONS

Lucas, J. F. et al., "Design and Evaluation of 3D Multiple Object Selection Techniques"; UIST (2005); 10 pgs.
Schlünsen, R. et al., "A VR Study on Freehand vs. Widgets for 3D Manipulation Tasks"; Association for Computing Machinery (2019); 11 pgs.
Barbedo, G. et al., "Counting Cattle in UAV Images—Dealing with Clustered Animals and Animal/Background Contrast Changes"; Sensors (2020); vol. 20:2126; 14 pgs.
Stenholt, R. et al., "Poster: Brush, Lasso, or Magic Wand? Picking the Right Tool for Large-Scale Multiple Object Selection Tasks"; IEEE Symposium on 3D User Interfaces (2012); pp. 163-164.
Yu, L. et al., "Efficient Structure-Aware Selection Techniques for 3D Point Cloud Visualizations with 2DOF Input"; IEEE Transactions on Visualization and Computer Graphics, vol. 18:12 (2012); pp. 2245-2254.

\* cited by examiner

REMOTE BASED ONLINE PRODUCT SELECTION

BACKGROUND

Technical Field

The present disclosure generally relates to data processing systems, and more particularly, to systems and methods for remote based online product selection.

Description of the Related Art

Online shopping systems generally provide a product page that a shopper can review and confirm selection of a single product per page presentation. The process usually starts with the shopper performing a query search for a particular item. A list of matches is displayed, sometimes with a graphic showing a representation of the product that can be selected. Once selected, a page dedicated to the one product is displayed. Commonly the shopper can manually click on a quantity of the product from a drop-down menu. The price for the quantity clicked is shown prior to confirming purchase.

From a technology perspective, current systems only recognize requests for single items through online interfaces. When a user wants to purchase an item in quantity, the interface only recognizes a search for a specific item and then, in some systems, provides pre-specified quantities. Such an approach is not conducive to replicating an in-person experience. With the growing popularity of virtual reality (VR) systems, users demand a better in-person experience. A VR system that is set up to present an interface for selecting items to purchase generally provides a browser that sends the user to a third party e-commerce site. Some VR systems present online stores to replicate an in-person experience yet browsing and purchases remain based on a single item of interest at a time. Item selection and purchase through VR showrooms is usually through a point and click system.

SUMMARY

According to an embodiment of the present disclosure, a computer implemented method for providing an online purchase is disclosed. The method provides displaying an electronic image of a plurality of items. A signal of a user drawn loop, drawn around one or more of the plurality of items in the electronic image is received through a network connection. The one or more items in the user drawn loop are identified. A cost for the items identified in the user drawn loop is determined. The cost is displayed.

In one embodiment, the user drawn loop is performed inside a virtual reality (VR) user interface. Users in a VR environment will appreciate the ability to use user drawn loops to select items in the VR space since in many VR systems, user actions may be replicated by using a virtual hand/finger as if the person were present in real-life. The user has control over which items of interest should be circled and can encircle multiple items simultaneously as if the user were really pointing at items in real-life.

According to another embodiment of the present disclosure, a computer program product for providing an online purchase includes one or more computer readable storage media, and program instructions collectively stored on the one or more computer readable storage media. The program instructions include displaying an electronic image of a plurality of items. A signal of a user drawn loop, drawn around one or more of the plurality of items in the electronic image is received through a network connection. The one or more items in the user drawn loop are identified. A cost for the items identified in the user drawn loop is determined. The cost is displayed.

Some embodiments include determining a quantity of the items in the user drawn loop and displaying the quantity. Bulk purchases may find this feature helpful since the user may not be able to see the exact number of items in an area and the user can easily control how many items are being selected for the final purchase while still using the convenient user controlled loop.

According to another embodiment of the present disclosure, a remote computer server for providing an online purchase includes: a network connection; one or more computer readable storage media; a processor coupled to the network connection and coupled to the one or more computer readable storage media; and a computer program product including: program instructions collectively stored on the one or more computer readable storage media, the program instructions include displaying an electronic image of a plurality of items. A signal of a user drawn loop, drawn around one or more of the plurality of items in the electronic image is received through the network connection. The one or more items in the user drawn loop are identified. A cost for the items identified in the user drawn loop is determined. The cost is displayed.

In an embodiment, the system predicts an estimate of the quantity of the items during a process of the user drawing the loop. The changing value of the estimate is displayed until the user drawn loop is completed. Users will appreciate that the estimate and changing value makes the selection of bulk items for accurate. The user can adjust their loop size on the fly to select the quantity desired without having to click and choose quantities manually through drop down selection.

In general, aspects of the subject technology provide a technological advantage over traditional purchase interfaces that usually allow selection of a single item at a time. A user drawn loop allows the user to select multiple instances of an item and simultaneously, different types of items within the same loop. For bulk purchasers, (for example retailers purchasing from a wholesaler, the VR interface can show different items that may be related or look better together, and the purchaser can select these items at the same time. The backend technology automatically identifies items in the loop area, purchasing information, and makes arrangement for purchase. For some bulk purchasers, the aspects of the subject technology save a lot of time by eliminating the need to visit an interface page for each and every item to be purchased.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods by which, while performing shopping, an online shopper can create an outline around products shown on a digital display, and purchase products simultaneously shown within the display. Generally, the user is engaging in shopping through a computing device connected to a network. Within the electronic display of the computing device, software may provide a user interface that identifies items within an image. The user may draw a loop around an area of items and the subject technology identifies the items within the boundaries of the user drawn loop. Characteristics of the items may be determined (for example, item type, price associated with item type, estimated consumption rate, and more) and information may be displayed to the user showing data about the items within the drawn loop area. Aspects of the subject technology provide for example, bulk purchase of one or more products that are shown on the display. In an illustrative embodiment, shopping may be performed through a virtual reality (VR) system. Graphical user interface (GUI) tools provide the user features to draw, adjust the loop boundary, select/deselect individual items, and confirm purchase. The subject technology provides an improved user interface and supporting backend process that provides the purchase of multiple items that may be of different types from the same interface. Some aspects improve a VR experience by including user controls that identify the different items within a user defined area. The user defined area is non-conventional when compared to previous user interfaces that display a single item on a page dedicated to the item when the user is ready to select and purchase.

Example Architecture

Figure 1:
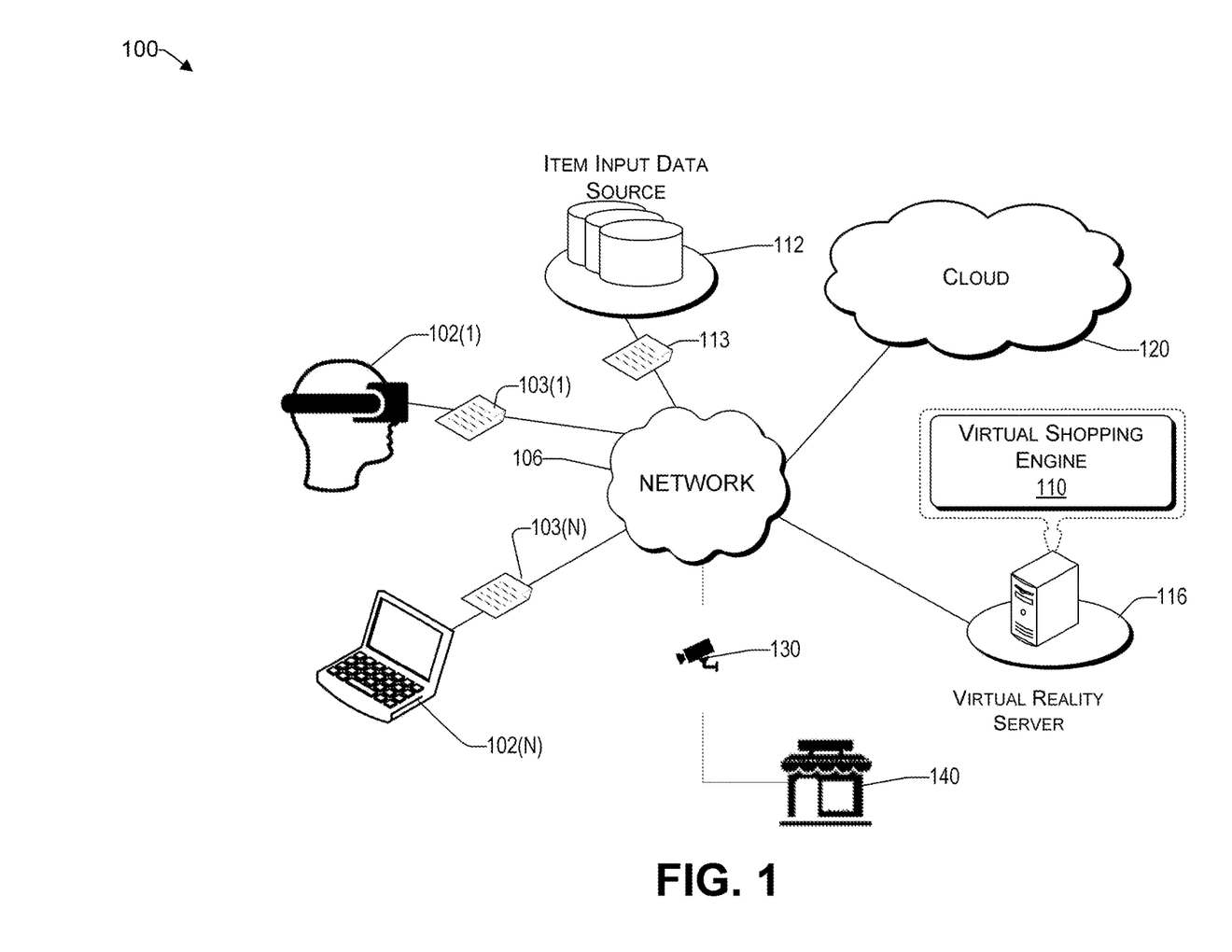
FIG. 1 is a block diagram of an architecture for a remote based online shopping system, according to an illustrative embodiment.

FIG. 1 illustrates an example architecture 100 for remote online shopping. Architecture 100 includes a network 106 that allows various computing devices 102(1) to 102(N) to communicate with each other, as well as other elements that are connected to the network 106, such as an item input data source 112, a VR server 116, the cloud 120, video camera(s) 130, and an institution 140. In the context of providing online shopping services under the subject disclosure, the computing devices 102(1) to 102(N) may be end user devices that are engaged in online selection and purchase of items that may be displayed within buildings (which may include indoor or outdoor areas) as disclosed herein and in more detail in the following figures. Data files 103(1) to 103(n) related to items 113 being browsed or purchased may be transferred in two-way communication between the computing devices 102(1) to 102(N) to other elements in the architecture 100.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. In cloud based embodiments, resources may be gathered from different computing devices connected to the cloud network.

For purposes of later discussion, several user devices appear in the drawing, to represent some examples of the computing devices that may be the source of online shopping requests, and results. In an illustrative embodiment, users may interface with the architecture 100 through a VR platform, represented by computing device 102(1), which shows a user wearing a head worn VR device. While a head worn device is shown, it will be understood that other VR devices may operate similarly with the rest of the architecture 100. In some embodiments, a software application may provide a user interface (UI) through which the user may perform online shopping using aspects of the subject technology. Some embodiments may provide a virtual reality server 116 that provides a virtual shopping engine 110 that provides the API for online shopping. As will be shown in greater detail below, the computing device 102(1) may be displayed an image through the online shopping API. The image may be provided by cameras 130 that are positioned in front of items in the business 140. The image may be live or static. The content in the image may be real (for example, a snapshot or live video feed of a real group of items) or may be a virtual representation of items (for example, digitally re-creations of items). In some embodiments, the image with items displayed may be formatted by the virtual shopping engine 110 for VR display. The user, seeing the image in computing device 102(1), may use pointing tools to draw a loop around one or more items in the presented image. Examples of pointing tools include a virtual stylus, a virtual finger, virtual cursor, gesture controls, and gaze tracking.

Some embodiments may use the subject technology in computing devices 102(n) that are not necessarily VR based. Personal computers, mobile computing devices, smart phones, smart wearable devices, kiosk computing devices and other computers with an electronic display interface may provide a remote online shopping environment using the subject technology allowing the user to draw a boundary around items in an image that are being requested for purchase.

The institution 140 may be a real life entity that sells products that are made available through the online shopping architecture. In some embodiments, the institution 140 may be a building or location that is not necessarily engaged in selling the product online but is a location that has items that can be identified by the online shopping engine 110. For example, in some embodiments, users may locate an image of an item(s) they wish to purchase. While the location has the item, the location of the item(s) may not be for sale through an e-commerce site of the institution 140. In some instances, the institution 140 does not sell items at all. However, in some embodiments, the online shopping engine 110 may identify the items defined by the user drawn loop in an image and the online shopping engine 110 may seek the item(s) through third party online vendors and present purchase information based on the data provided by the third party sites. In some embodiments, the institution 140 may be a virtual storefront. The items may be displayed in a virtual setting. The institution 140 may have access to the selected items by way of purchasing agreements and vendor sources. Or in some embodiments, the institution 140 provides the purchasing platform interface for users to locate grouped items and the business 140 seeks the item(s) via third party e-commerce shopping sites.

The online shopping engine 110 may understand the information being defined by the UI pointing tool used to draw the loop/boundary around items for purchase. For example, the online shopping engine 110 may perform image analysis to identify products (or items in general) within the loop. Identified items may be analyzed for type, size, and cost per unit. The quantity of items within the loop may be estimated based on the area encircled and in some embodiments, the volume of the area encircled (for example, in piles or stacks of items). While a loop may be regarded as two dimensional, in some embodiments the items may be arranged with items stacked or occupying a depth of space. The loop boundary may be considered to extend to the furthest item back within the depth of space. In some embodiments, the online shopping engine 110 may display a running estimate of quantity being selected as the user is drawing the loop. Users may adjust the loop boundary as they draw based on the quantity (and/or other related data being shown such as price). The online shopping engine 110 may calculate related characteristics to the items encircled. Characteristics may include for example, total price, consumption rate of the amount selected, how many days of product stock is selected. The online shopping engine 110 may determine whether multiple item types are present within the zone of the loop and may perform calculations for each item type. In some embodiments, the online shopping engine 110 may determine a variable characteristic shared by members of an item type (for example, freshness or weight) and may generate a value for the lot of items selected based on individual item values. As may be appreciated, this may be helpful in lot purchases or auction bids.

While the item input data source 112 and the virtual shopping engine 110 are illustrated by way of example to be on different platforms, it will be understood that in various embodiments, the item input data source 112 and the virtual reality server 116 may be combined. In other embodiments, these computing platforms may be implemented by virtual computing devices in the form of virtual machines or software containers that are hosted in a cloud 120, thereby providing an elastic architecture for processing and storage.

Examples of the user drawn loop process and item selection scenarios are provide in more in the disclosure that follows.

Example Application

Figure 2:
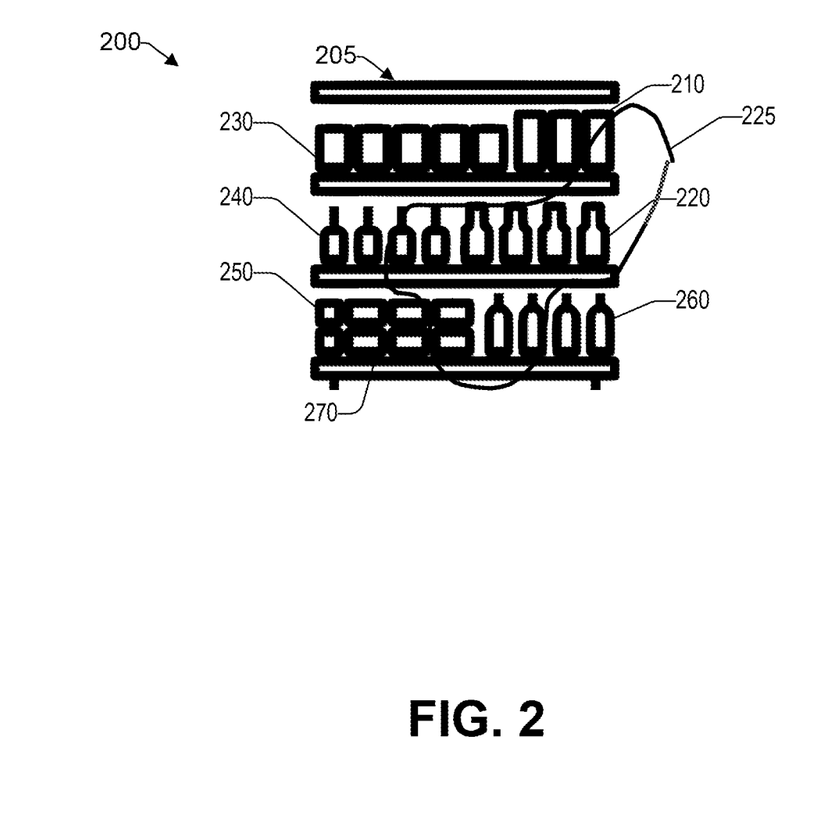
FIG. 2 is a diagrammatic view of a virtual store shelve and a virtual tool for purchasing multiple items simultaneously, according to an illustrative embodiment.
Figure 3:
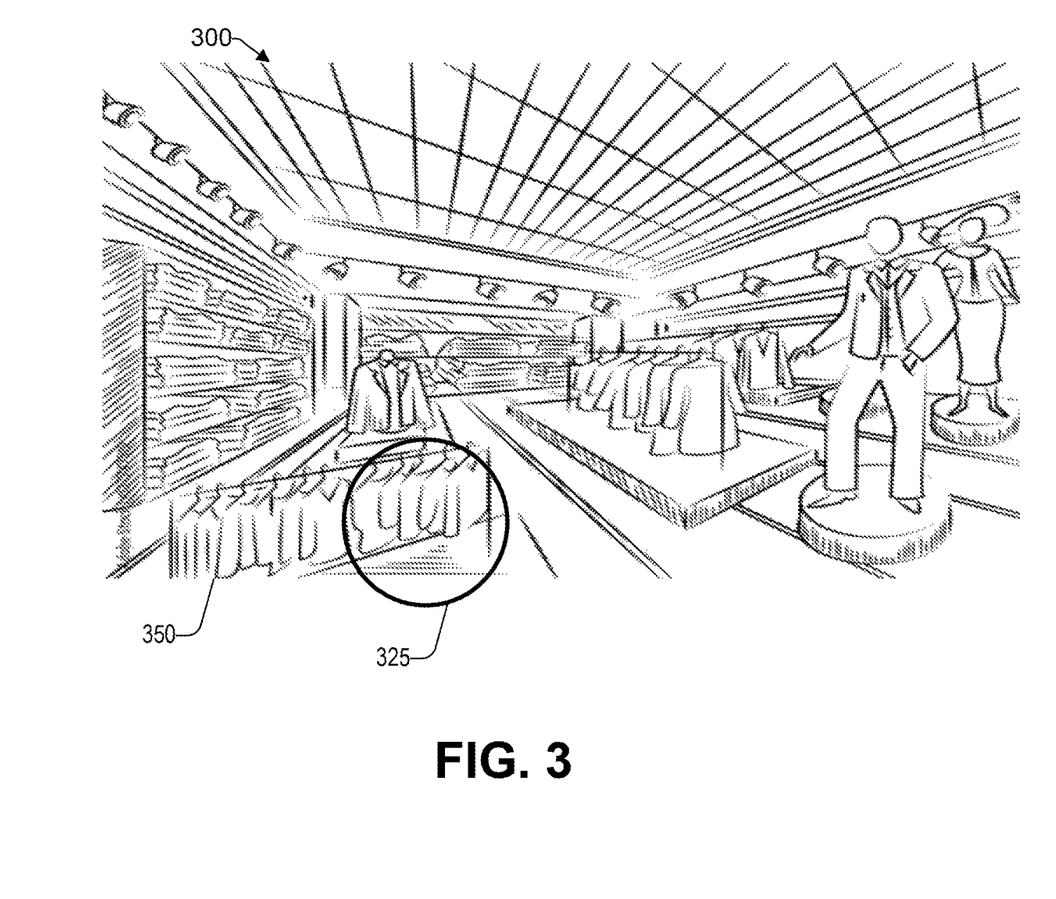
FIG. 3 is a diagrammatic view of an electronically displayed showroom and a virtual tool for purchasing multiple items simultaneously, according to an illustrative embodiment.
Figure 4:
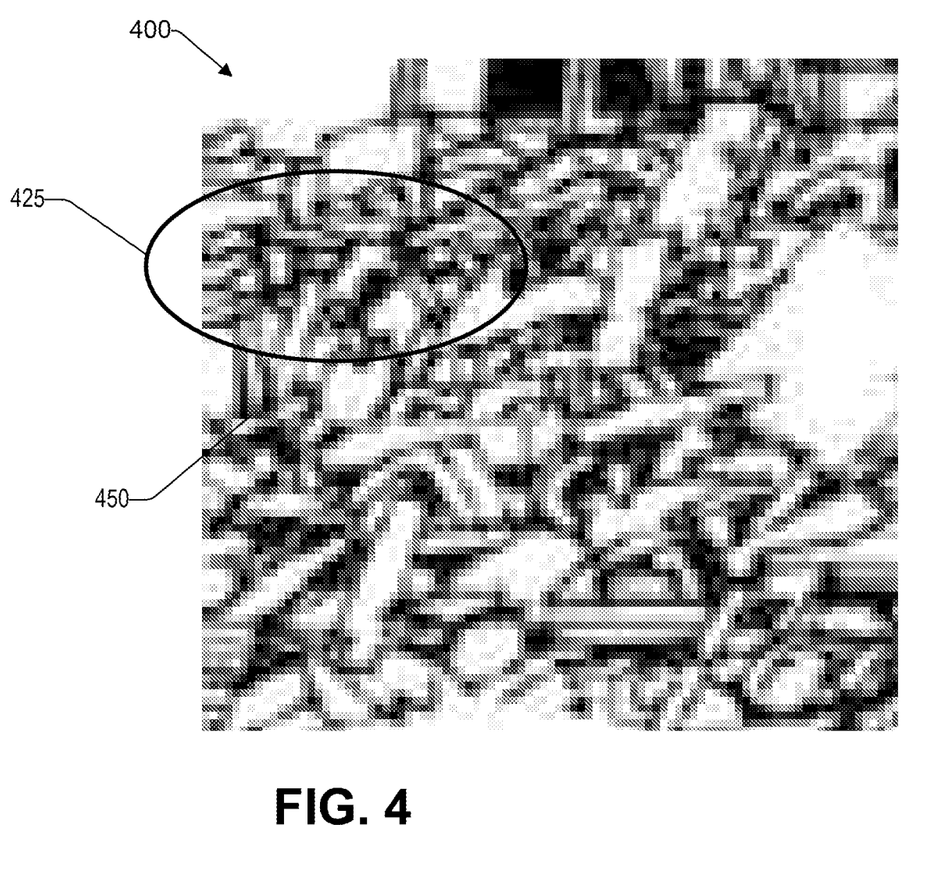
FIG. 4 is a diagrammatic view of an electronically displayed scrapyard and a virtual tool outline showing a simultaneous virtual selection of multiple dissimilar items, according to an illustrative embodiment.

Referring now to FIGS. 2-4, examples of electronically displayed images of items selected under the subject technology are shown as illustrative embodiments. While illustrative, these are merely a few examples to provide context of different scenarios in which a user may shop for different items that the online shopping engine 110 is able to process and execute for online purchase.

FIG. 2 shows an electronic image 200 of virtual items on a virtual store shelving system 205. In the virtual store shelving system 205, the items shown are assumed to be a single layer of items. In some embodiments, features may include a user selected multiplier to add additional virtual layers (for example, items may be 2×, 3×, n× deep on each shelf). The items may be organized by the online shopping engine 110 into predicted groups of items. For example, the items may be related to a same group of item types (for example, all condiments) or items related to a theme in common (for example, baking ingredients). A user may draw a loop 225 around the items of interest. As can be seen, the user drawn loop 225 may be non-uniform (for example, non-circular or an arbitrary path of varying slopes and turns. The loop 225 may encircle some items and avoid others. The user has control to draw the loop 225 so that one or more items of the same type are grouped together with one or more items of other types. The user selection is based on items inside the boundary of the loop 225. The loop 225 may not be a fully enclosed loop (for example, there may be a gap at the starting and end points) and the online shopping engine 110 may determine when the loop 225 is sufficiently drawn to define an area of interest. As shown in the figure, item types 210, 220, 240, 260, and 270 are encircled within the boundary of the user drawn loop. In the loop drawn, only a single item 210 is encircled while a multiple instances of items 220 and 240 are within the user selected area. The online shopping engine 110 may determine when only partial items are enclosed within the loop 225. Some embodiments may include a percentage value threshold to determine how much of an item needs to be encircled to be considered part of the items being selected. The online shopping engine 110 may determine an identity for each item, how many of each item type is selected by the loop drawn, the cost of each item, and the total cost for items within the loop 225. The online shopping engine 110 may display the information to the user so that the user can confirm the selection, move to purchase, or modify/delete the selection.

Referring now to FIG. 3, an image 300 of a store interior is shown. The store interior may be a live shot of a retail store floor room, a snapshot image of a retail store floor room, or a virtual recreation of a floor room. In FIG. 3, the items shown are apparel type merchandise. The store may be a wholesaler for formal events. The user may be a retail vendor selecting items in bulk for the upcoming season. In FIG. 3, the shopper has selected multiple instances of a clothing top hanging on a rack 350 in the user drawn loop 325. The online shopping engine 110 provides the number and total cost for the selection. The user could have also selected folded items on the wall shelves, in which case, the online shopping engine 110 determines the number of items in a stack and provides the cost for the purchase.

FIG. 4 shows an image 400 of a section of a real life scrapyard 450 that has various different types of items set in a random pile. The image may be from a real-camera. As may be known, the resolution of some real cameras can be poor resulting in pixilation. Yet, as may be appreciated, for this example, the end user may not need to see the desired items with clarity because they are selecting material in bulk. The items inside a user drawn loop 425 may have different shapes and sizes. The online shopping engine 110 may determine a material of the items, a bulk rate for weight of the items, a volume of items selected within the loop 425, and a total cost for the volume of item material within the loop 425. As may be appreciated, the exact items within the loop 425 are not necessarily what the shopper wants but instead represent how much of a random or non-uniform item is desired to be obtained. The image may not necessarily be an accurate current scrapyard inventory. In some embodiments, a backend computer implemented process may immediately calculate the volume being selected and estimate how much material/items are within the calculated volume. However, the image 400 may provide the user a perspective on how much material is within a desired volume or budget of material. When the user confirms purchase, the actual goods delivered may be different than what was selected in the image.

Example Methodology

Figure 5:
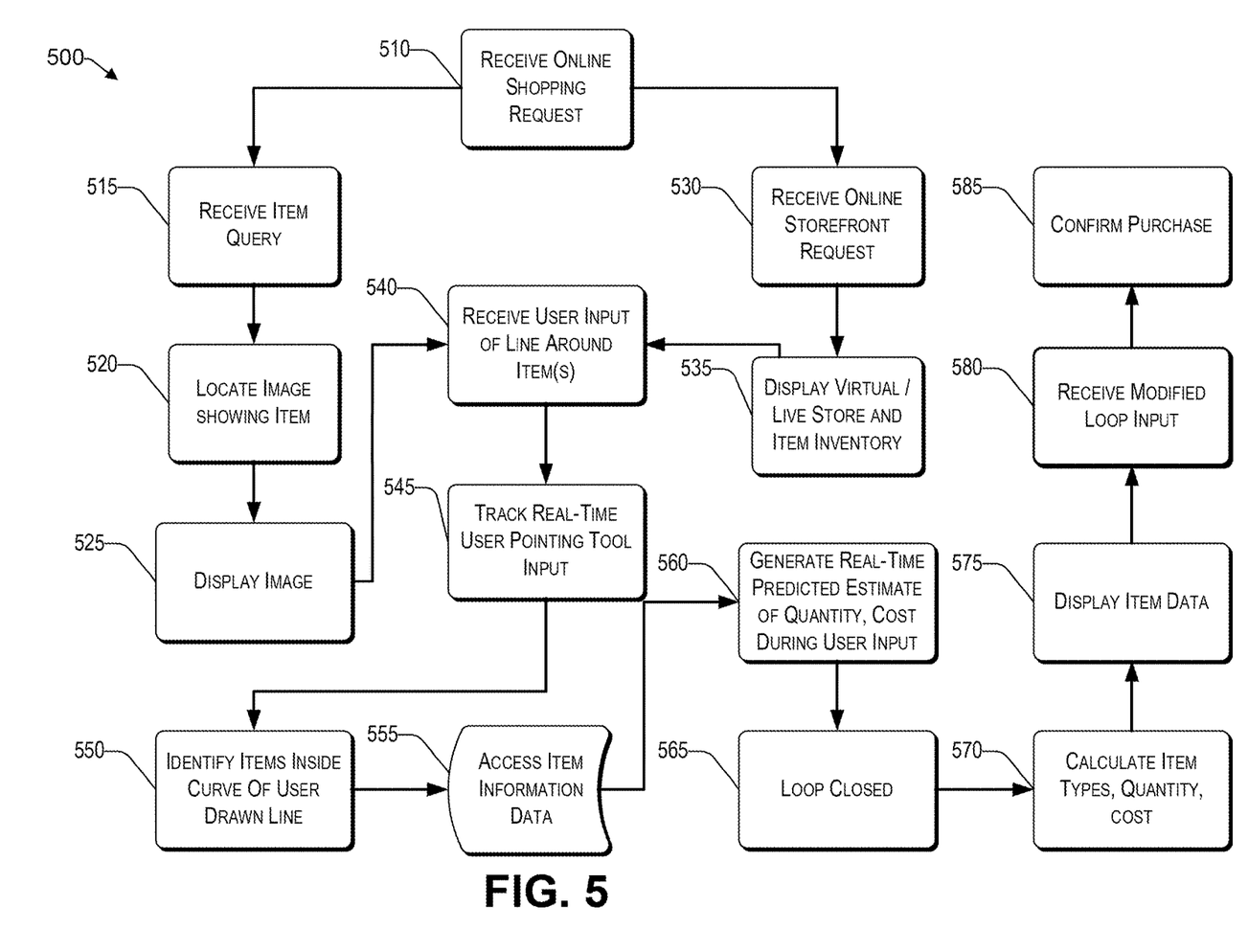
FIG. 5 is a block diagram of a method for providing an online shopping environment, according to some embodiments.

Referring now to FIG. 5, a method 500 for providing an online shopping environment is shown according to an illustrative embodiment. Generally, a computing device, (for example, either a host platform computer server such as the computing device 102(*n*), or the virtual reality server 116 in the event the user is operating a VR system), receives 510 an online shopping request. In some embodiments, the user may use an API that includes a general search query for an item(s) of interest. Some embodiments include an item query engine 644 (See FIG. 6) that may perform a general Internet search for item images and image sources or may search an internal inventory if the user engages the system through an online storefront (described below). When the query is received 515 by the computing device 102(*n*) or VR server 116, an image of the item(s) is located 520 by accessing either an internal database (for example, item input data source 112) or an external database. The retrieved image is displayed 525 showing the item(s) of interest.

In some embodiments, the system may provide another means for shopping through a pre-generated online store as an alternative to using a general online query search. Some embodiments may include a virtual storefront generator module 642 (See FIG. 6) that generates online storefronts that can be accessed by websites, mobile apps, or VR applications. The online store may include storefront templates that display items of interest in a digitized replicated storefront environment. In some embodiments, the online storefront is an e-commerce website that has access to inventory sources if not their own inventory on site. Upon the computing device receiving 530 a request for visiting an online storefront, a storefront may be displayed 535. The storefront may be a virtual showroom, a static or live video image of a real-life store or section of a store, or a user interface that is configured to receive a user item request and display the results for purchase. In response to a user request for one or more items, images of items (or avatars representing items) are retrieved 535 by the computing device 102(*n*) or VR server 116. Examples of how retrieved items may be displayed were provided in FIGS. 2 to 4, however it will be understood that other ways of displaying multiple items are contemplated within the scope of this disclosure.

The computing device 102(*n*) or VR server 116 receives 540 a signal that the user is generating a line around an item(s) of interest through a pointing tool. The computing device 102(*n*) or VR server 116 tracks 545 the path of the pointing tool in real-time. For example, a mouse cursor or a finger touch on a tactile display is detected as encircling a group of items. Or in the case the user is operating a VR system, a virtual pointer is tracked as it moves around the items of interest. As the pointing tool path is being generated, a pointing tool area calculator module 646 (See FIG. 6) may predict the final enclosed area of the loop being drawn. An item identification module 643 (See FIG. 6) may identify items within the area of the loop being predicted. The computing device 102(*n*) or VR server 116 may access the item input data source 112 for information on each item within the predicted user drawn loop. During the loop drawing process, an item quantity calculator module 645 (See FIG. 6) may estimate the number of items (and in some embodiments by each different item type) within the predicted loop. In some embodiments, a cost calculator module engine 647 (See FIG. 6) calculates an estimated total cost for the items within the predicted area in the process of being selected. The estimated quantity and total cost are represented by block 560.

As may be appreciated, the features of estimating quantity and cost while a user is drawing a loop around items can be helpful for the user to adjust the size of the loop and area in the image being enclosed for the item selection. The real-time estimation features provide real-time feedback and perspective on how much bulk purchasing of some items cost. As an illustrative example, some people want to purchase a large order of flowers for an event or as a grand gesture to decorate an area. However, fresh flowers in bulk can quickly become very expensive. A shopper can easily see how much a desired volume of flowers costs and can also see how many actual flowers they can buy based on their budget with just a few strokes of a pointing device.

The computing device 102(*n*) or VR server 116 receives 565 a signal from the user interface when the user drawn loop is complete. The item types, quantity of each type, and cost of each type and total costs are calculated 570. The final calculated item information is displayed 575 to the user. In some embodiments, if the user wishes to modify the area of the loop, a feature may be selected to edit/modify 580 the loop area. Editing or modifying may include for example, drawing a line to truncate an area of the original loop, dividing the loop into sub-areas which then provides information for each area, or erasing sections of the loop. Once a user drawn loop around items of interest is finalized or accepted, the computing device 102(*n*) or VR server 116 may receive a confirmation 585 to purchase the selected items. Selected items may be retrieved from an inventory or a third party service may be used to obtain the items.

Example Computer Platform

Figure 6:
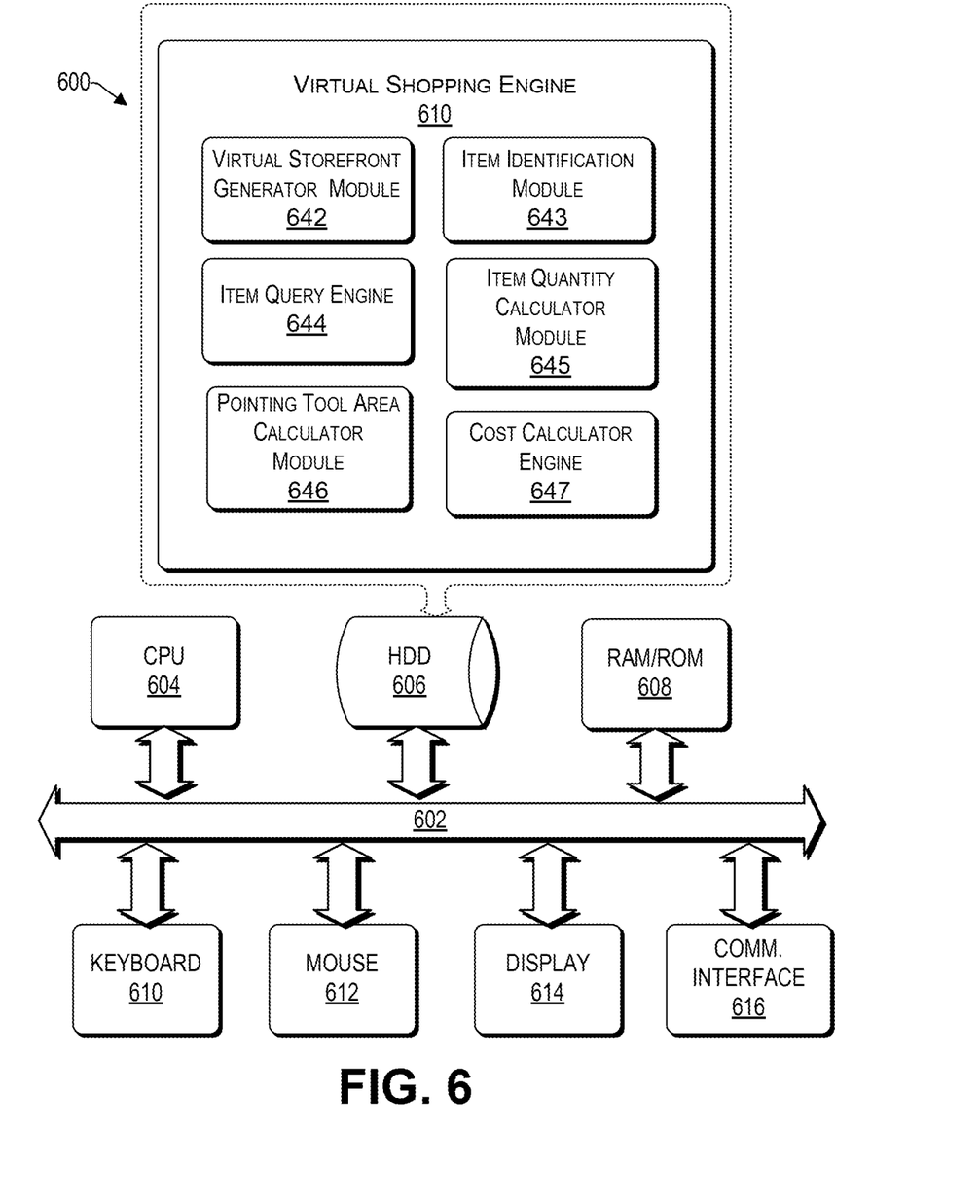
FIG. 6 is a functional block diagram illustration of a particularly configured computer hardware platform that can communicate with various networked components, consistent with an illustrative embodiment.

As discussed above, functions relating to online purchasing of the subject disclosure can be performed with the use of one or more computing devices connected for data communication via wireless or wired communication, as shown in FIG. 1. FIG. 6 is a functional block diagram illustration of a particularly configured computer hardware platform that can communicate with various networked components, such as the computing device 102(*n*), VR server 116, or the cloud 120, etc. In particular, FIG. 6 illustrates a network or host computer platform 600, as may be used to implement a server, such as the computing device 102(*n*) or VR server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the virtual shopping engine 110, in a manner described herein. The virtual shopping engine 110 may have various modules configured to perform different functions. For example, the virtual shopping engine 110 may include the virtual storefront generator module 642, item identification module 643, the item query engine 644, item quantity calculator module 645, the pointing tool area calculator module 646, and the cost calculator module engine 647, whose functions have been previously described, with examples in FIG. 5.

Example Cloud Platform

As discussed above, functions relating to data processing using a machine learning model to discover new materials for application specific tasks (for example carbon dioxide separation), may include a cloud computing environment 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
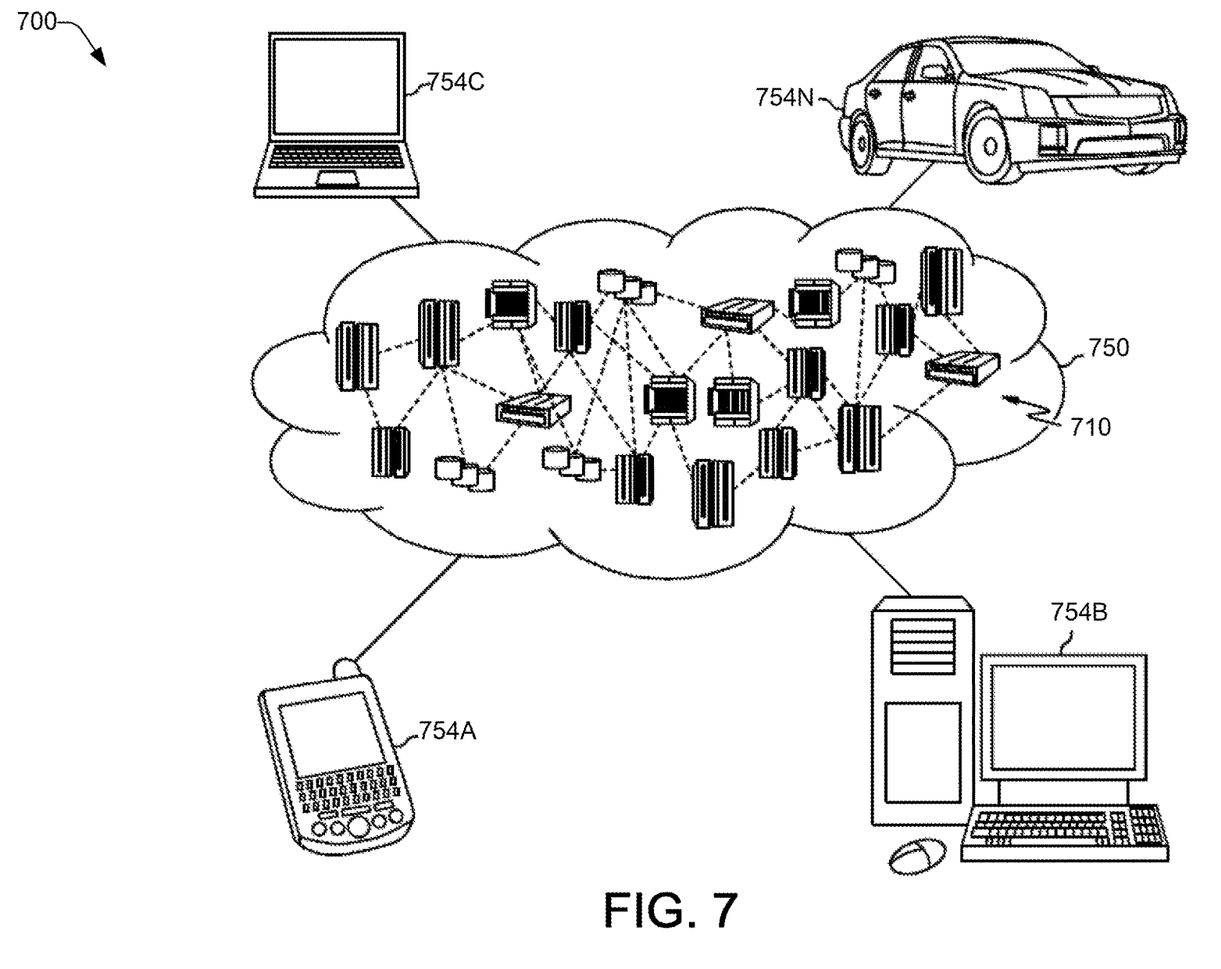
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
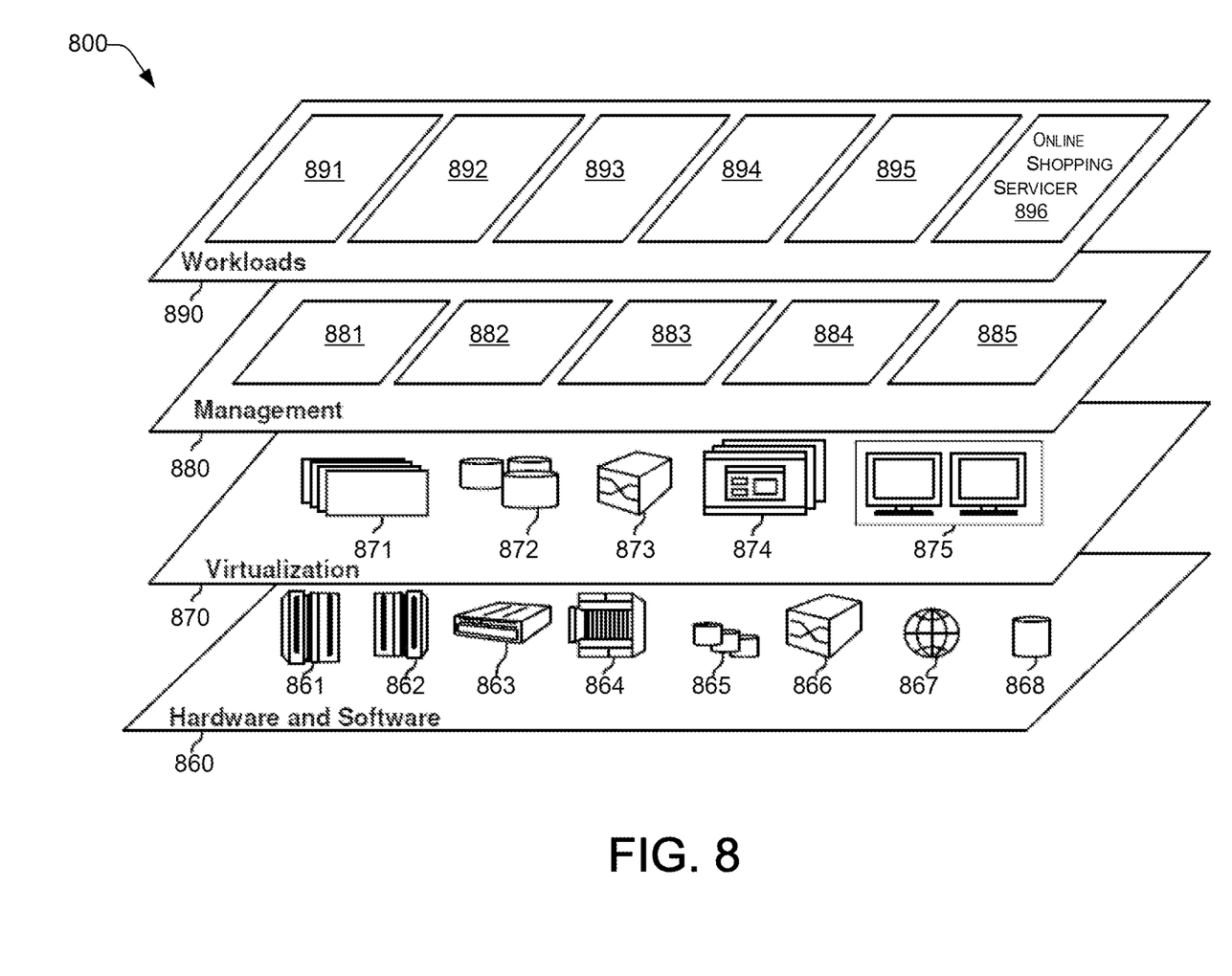
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and online shopping service administration 896, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for providing an online purchase, the method comprising:
sending, by a computing device, an electronic image of a plurality of items to be displayed on a virtual reality (VR) user interface;
receiving, by the computing device, through a network connection, a signal of a user drawn loop inside the VR user interface, drawn around the items in the electronic image displayed on the VR user interface;
determining, by the computing device, a volume of the area encircled in the user drawn loop;
identifying, by the computing device, the items in the user drawn loop based on the determined volume;
determining, by the computing device, a cost for the items identified in the user drawn loop of the determined volume; and
sending, by the computing device, the cost to be displayed on the VR user interface in real time.

2. The method of claim 1, further comprising:
determining, by the computing device, a quantity of the items in the user drawn loop; and
sending, by the computing device, the determined quantity to be displayed on the VR user interface.

3. The method of claim 1, further comprising:
predicting, by the computing device, an estimate of the quantity of the items during a process of the user drawing the loop; and
sending, by the computing device, a changing value of the estimate to be displayed on the VR user interface, until the user drawn loop is completed.

4. The method of claim 1, wherein a contour of the user drawn loop is non-uniform.

5. The method of claim 1, further comprising determining, by the computing device, a type for each of the items in the user drawn loop.

6. The method of claim 5, further comprising calculating a total cost of all items in the user drawn loop based on determining:
a cost per unit for each type of the items; and
a total number of units for each type of the items.

7. A computer program product for providing an online purchase, the computer program product comprising:
one or more non-transitory computer readable storage media, and program instructions collectively stored on the one or more computer readable storage media, wherein an execution of the program instructions configures the computing device to perform acts comprising:
displaying an electronic image of a plurality of items on a virtual reality (VR) user interface;
receiving, through a network connection, a signal of a user drawn loop inside the VR user interface, drawn around the items in the electronic image displayed on the VR user interface;
determining a volume of the area encircled in the user drawn loop;
identifying the items in the user drawn loop inside the VR user interface;
determining a cost for the items identified in the user drawn loop; and
the cost to be displayed on the VR user interface in real time.

8. The computer program product of claim 7, wherein the execution of the program instructions further configures the computing device to perform additional acts comprising:
determining a quantity of the items in the user drawn loop; and
displaying the quantity.

9. The computer program product of claim 7, wherein the execution of the program instructions further configures the computing device to perform additional acts comprising:

predicting an estimate of the quantity of the items during a process of the user drawing the loop; and sending a changing value of the estimate to the VR user interface until the user drawn loop is completed.

10. The computer program product of claim 7, wherein a contour of the user drawn loop is non-uniform.

11. The computer program product of claim 7, wherein the execution of the program instructions further configures the computing device to perform an additional act comprising determining a type for each of the items in the user drawn loop.

12. The computer program product of claim 7, wherein the execution of the program instructions further configures the computing device to perform additional acts comprising calculating a total cost of all items in the user drawn loop based on determining:

a cost per unit for each type of the items; and a total number of units for each type of the items.

13. A computer server for providing an online purchase, comprising:

a network connection;

one or more computer readable storage media;

a processor coupled to the network connection and coupled to the one or more computer readable storage media; and a computer program product comprising program instructions collectively stored on the one or more computer readable storage media, wherein an execution of the program instructions by the processor configures the processor to perform acts comprising:

sending an electronic image of a plurality of items to be displayed on a virtual reality (VR) user interface;

receiving from the VR user interface, through the network connection, a signal of a user drawn loop, drawn around the items in the electronic image displayed on the VR user interface;

determining a volume of the area encircled in the user drawn loop;

identifying the items in the user drawn loop based on the determined volume;

determining a cost for the items identified in the user drawn loop of the determined volume; and sending information over the network connection the cost to be displayed on the VR user interface in real time.

14. The computer server of claim 13, wherein the execution of the program instructions by the processor further configure the computing device to perform acts comprising:

determining a quantity of the items in the user drawn loop; and displaying the quantity.

15. The computer server of claim 13, wherein the execution of the program instructions by the processor further configure the computing device to perform acts comprising:

predicting an estimate of the quantity of the items during a process of the user drawing the loop; and displaying a changing value of the estimate until the user drawn loop is completed.

16. The computer server of claim 13, wherein a contour of the user drawn loop is non-uniform.

17. The computer server of claim 13, wherein the execution of the program instructions by the processor further configure the computing device to perform acts comprising:

determining a type for each of the items in the user drawn loop; and calculating a total cost of all items in the user drawn loop based on determining:

a cost per unit for each type of the items; and a total number of units for each type of the items.

* * * * *